Sept. 26, 1961 L. A. RUNTON 3,001,362
INSULATOR FOR ROCKET MOTOR
Filed July 26, 1957
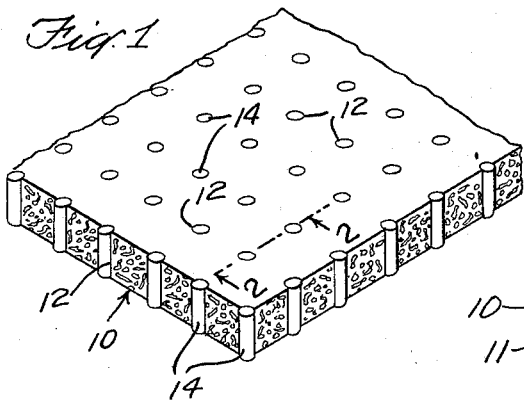
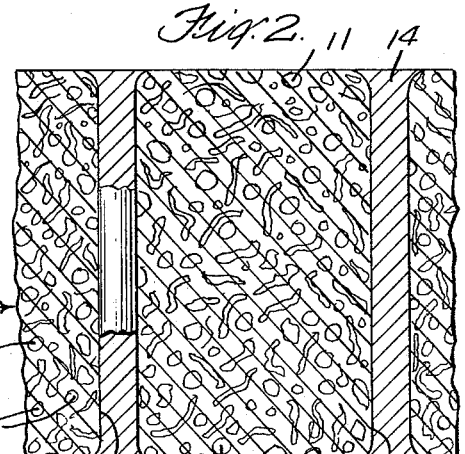
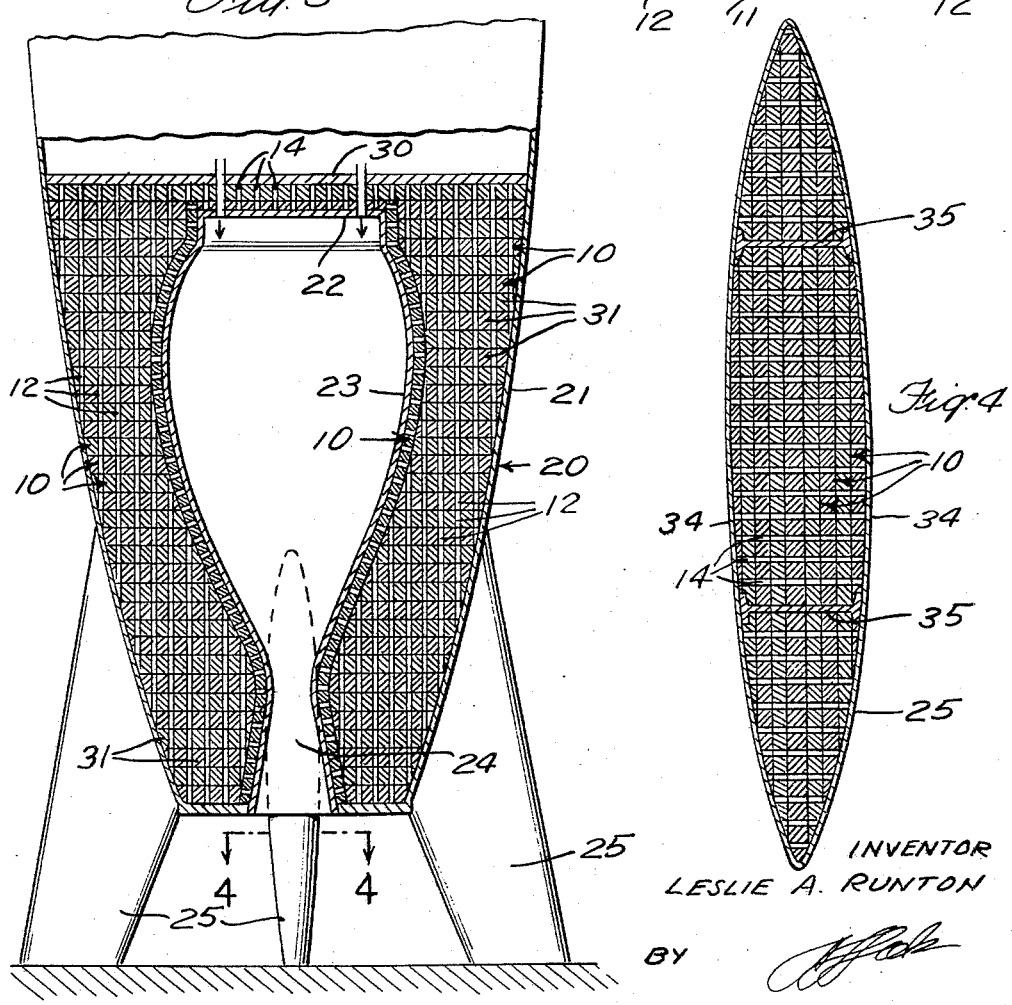
INVENTOR
LESLIE A. RUNTON
BY
ATTORNEY 3,001,362
INSULATOR FOR ROCKET MOTOR
Leslie A. Runton, Middle Haddam, Conn., assignor to The Russell Manufacturing Company, Middletown, Conn., a corporation of Connecticut
Filed July 26, 1957, Ser. No. 674,352
4 Claims. (Cl. 60—35.6)

This invention relates to rocket motors and more particularly to reinforcing and supporting means to assist the motor walls in withstanding the thrust of the gases.

The combustion chamber of rocket motors must be accurately designed and shaped to produce the maximum thrust which must be withstood by the walls of the chamber and particularly by the forward wall. Due to the high temperature involved the walls may be in a somewhat weakened condition at the time of maximum stress. Hence the walls are generally made of extra thickness or are otherwise reinforced, which increases the weight of the motor.

An object of this invention is to provide a strengthening and reinforcing means for such walls which is light in weight and which will withstand high temperatures.

Another object is to transfer the stress from the hot motor walls to relatively cool outer walls.

Another object is to provide means to withstand or prevent the development of destructive supersonic vibrations in the rocket.

Another object is to provide a light weight reinforcing means for airfoil surfaces of supersonic rockets or planes, which in flight become heated due to air friction.

Various other objects and advantages will be apparent as the nature of the invention is more fully disclosed.

In accordance with the present invention light weight blocks of glass fibers, ceramic fibers or asbestos are provided with a series of transverse holes which are filled with a high temperature zirconium cement to form a series of cement columns. These blocks are laid in the space between the walls of the motor combustion chamber and the outer walls of the rocket or outer retaining walls. The blocks may if desired be molded to the shape of the combustion chamber.

In the case of air foils the blocks are disposed within the foil with the cement column extending between the outer walls.

In use the cement columns are supported by the fibers of the block which are capable of withstanding temperatures of the order of 2000° F. and being highly refractory are capable of transferring the load from the hot motor walls to the cooler outer walls with a minimum of heat transfer. The zirconium cement is capable of withstanding temperatures of the order of 5000° F. Hence the cement columns remain effective even if the temperature has risen to a point to destroy the ceramic fibers of the block.

The cement columns may be omitted from the outer layers since the temperature in such layers will not rise to a point sufficient to destroy the ceramic fibers which will therefore be capable of withstanding the thrust of the inner layer or layers.

The nature of the invention will be better understood by referring to the following description, taken in connection with the accompanying drawing, in which a specific embodiment has been set forth for purposes of illustration.

In the drawing:

FIG. 1 is a perspective view of a reinforcing sheet embodying the invention;

FIG. 2 is an enlarged section taken on the line 2—2 of FIG. 1;

FIG. 3 is a vertical section through the motor section of a rocket; and

FIG. 4 is a section taken on the line 4—4 of FIG. 3.

Referring to the drawing more in detail a sheet 10 of refractory fibers is formed by the technique normally used in making paper board, for example in a Fourdrinier machine wherein the fibers are picked up from a slurry onto a rotating screen where they are built up into a layer of the desired thickness together with a heat-hardenable bonding agent. The sheet may be rolled onto a take-up roll and the fibers upset and reoriented by a spiked roll engaging the sheet as it is rolled onto the take-up roll, as shown more in detail in my Patent No. 2,815,793 dated December 10, 1957. When the sheet has built up to the desired thickness on the take-up roll it is split, removed, dried and heat-cured to set the bonding agent in the usual manner to form a felted fiber sheet with the fibers randomly oriented.

For the present purpose the refractory fibers may be composed of glass, ceramic, asbestos or other material having a high heat resistance. For lightness in weight small phenolic balls 11 containing inert gas may be mixed with the fibers to impart a cellular structure to the sheet.

The block 10 is pierced at selected points to form transverse holes 12 which are filled with a high temperature cement such as zirconium cement to form rigid refractory columns 14, which extend transversely of the sheet at selected points. These columns 14 are to constitute the load carrying members of the reinforcing blocks and are designed as to size and distribution in accordance with the loads to be carried.

FIGS. 3 and 4 illustrate the use of the above described reinforcing blocks in connection with the fins and the motor chamber of a rocket. In FIG. 3 the lower section of a rocket shell or casing 20 is shown, carrying the motor combustion chamber 21 composed of a transverse forward wall 22 and cone-shaped side walls 23 terminating in a jet opening 24. The rocket is shown as resting on tail fins 25 in position for firing.

The combustion chamber 21 is accurately designed in accordance with the type of fuel to produce the desired thrust with a minimum of turbulence and it is of importance for the walls to retain this shape throughout the flight of the rocket. Any variation due, for example, to distortion of the walls when weakened by extreme heat would introduce turbulence and cause detonations that may reach such proportions as to destroy the rocket. A series of sheets 10 are laid across the forward wall 22 of the motor chamber 20 with the columns of superimposed sheets in registration to fill the space between the wall 22 and a retaining wall 30 of the rocket. Alternatively a single layer of the sheet 10 may be disposed on the wall 22 and one or more backing layers of the same sheet material but without the cement columns 14 may be used since the temperature is reduced by the insulating effect of the inner layer to a point where the refractory fibers of the outer layers are capable of withstanding the thrust of the columns 14 of the inner layer.

Similar sheets 10 are wrapped around the tapered walls 23 with their cement columns extending normal to the walls. To facilitate installation the sheets may be softened by wetting and cut and shaped to conform to the walls 23. The space between the layer of the sheet 10 around the walls 23 and the shell or case 21 of the rocket may be filled by rings 31 of the same material but with the cement columns 14 omitted for lightness. These rings may be cut to fit the space and stacked as shown.

In operation the thrust of the walls 23 is taken by the cement columns 14 of the inner layer of material and is transferred by the outer refractory rings to the outer case or wall 21. Since the walls 21 and 30 are relatively cool any distortions of the hot walls 22 and 23 is resisted. Hence the walls 22 and 23 of the motor chamber 20 may be made of lighter metal or of less expensive alloys than would otherwise be required.

The fins 25 are comopsed of spaced outer walls 34 as shown in FIG. 4 supported by beams 35. Since these walls also become heated to a high temperature by air friction similar reinforcing means may be employed to prevent their distortion. For this purpose a series of sheets 10 are stacked within the fins 25 between the walls 34 with their cement columns 14 in alignment to provide compression members capable of resisting distortion of the hot walls. Obviously other air foil surfaces such as the wings, rudders, ailerons, stabilizers, etc. of supersonic aircraft may be similarly reinforced.

What is claimed is:

1. A reinforcing member for high temperature installations, comprising a sheet composed of bonded refractory fibers, and a plurality of columns of a refractory cement extending transversely entirely through said sheet and spaced over the surface thereof, said bonded refractory fibers filling the spaces between said columns and maintaining said columns in parallel spaced relationship, said columns being highly resistant to compression and constituting load supporting members.

2. An airfoil comprising outer walls having a space therebetween, and sheets of bonded refractory fibers disposed in said space between said outer walls, said sheets having columns of refractory cement extending transversely entirely therethrough, the columns of superimposed sheets being in registration to form compression members extending between said outer walls to prevent distortion thereof, said bonded refractory fibers filling the spaces between said columns and maintaining said columns in parallel spaced relationship.

3. In a rocket having outer walls and a motor combustion chamber disposed therein having walls spaced from said rocket walls, reinforcing members for said combustion chambers walls comprising a layer of bonded refractory fiber disposed around said chamber walls and having transverse columns of refractory cement spaced along the surface thereof and extending entirely through said sheet normal to said walls, said bonded refractory fibers filling the spaces between said columns and maintaining said columns in parallel spaced relationship, and additional refractory material disposed between said sheet and said rocket walls to transfer the thrust of said columns to said rocket walls.

4. A rocket as set forth in claim 3 in which said other refractory members comprise sheets similar to said first sheets with the columns thereof in registration with the columns of said first sheet.

References Cited in the file of this patent

UNITED STATES PATENTS

| | | |
|---|---|---|
| 1,795,200 | Crossley | Mar. 3, 1931 |
| 1,798,934 | Forse | Mar. 31, 1931 |
| 1,861,759 | Soper | June 7, 1932 |
| 2,140,210 | Schenk | Dec. 13, 1938 |
| 2,159,300 | Tashjian | May 23, 1939 |
| 2,375,058 | Wiegand | May 1, 1945 |
| 2,446,429 | Nelson et al. | Aug. 3, 1948 |
| 2,692,219 | Slayter et al. | Oct. 19, 1954 |
| 2,699,036 | Nicholoson | Jan. 11, 1955 |
| 2,706,382 | Logan et al. | Apr. 19, 1955 |
| 2,749,061 | Franz | June 5, 1956 |
| 2,778,761 | Frieder et al. | Jan. 22, 1957 |
| 2,791,386 | Kastan | May 7, 1957 |
| 2,806,509 | Bozzacco et al. | Sept. 17, 1957 |
| 2,811,457 | Speil et al. | Oct. 29, 1957 |

FOREIGN PATENTS

| | | |
|---|---|---|
| 889,233 | France | Jan. 4, 1944 |